US006294979B1

(12) United States Patent
Sano

(10) Patent No.: US 6,294,979 B1
(45) Date of Patent: Sep. 25, 2001

(54) RADIO PAGING RECEIVER AND RADIO RECEIVER

(75) Inventor: Kazumi Sano, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/129,409

(22) Filed: Aug. 5, 1998

(51) Int. Cl.[7] ........................................ H04Q 7/00

(52) U.S. Cl. .................................... 340/7.33; 340/7.24

(58) Field of Search ............................ 340/825.44, 7.2, 340/7.24, 7.32, 7.33, 7.34, 7.35, 7.43, 7.31

(56) References Cited

U.S. PATENT DOCUMENTS 5,606,712 * 2/1997 Hidaka ................................ 395/800
5,801,640 * 9/1998 Yashizawa ...................... 340/825.44

FOREIGN PATENT DOCUMENTS 4-304039 10/1992 (JP) .
5-199163 8/1993 (JP) .

* cited by examiner

*Primary Examiner*—Michael Horabik
*Assistant Examiner*—M. Shimizu
(74) *Attorney, Agent, or Firm*—Young & Thompson

(57) ABSTRACT

Disclosed is a radio paging receiver which has: a radio unit that receives a carrier wave modulated by a specific paging signal and a message signal following the specific paging signal; a demodulating unit that demodulates the modulated carrier wave into a signal; a decoding unit that decodes the signal demodulated by the demodulating unit into the specific paging signal and the message signal according to a predetermined signal format; a controller that compares the specific paging signal with a preset its own calling number and actuates a alert signal generating unit when the specific paging signal coincides with the calling number; and a display that displays a received message; wherein the radio paging receiver has a function that judges whether to apply a code inserting function to a received schedule message signal or not, the code inserting function being operated such that a predetermined code is inserted into a predetermined position of the received schedule message signal when applying the code inserting function thereto is allowed.

8 Claims, 9 Drawing Sheets

FIG. 3 PRIOR ART

| 4-BIT CODE | DISPLAY CODE |
|---|---|
| 0 0 0 0 | 0 |
| 0 0 0 1 | 1 |
| 0 0 1 0 | 2 |
| 0 0 1 1 | 3 |
| 0 1 0 0 | 4 |
| 0 1 0 1 | 5 |
| 0 1 1 0 | 6 |
| 0 1 1 1 | 7 |
| 1 0 0 0 | 8 |
| 1 0 0 1 | 9 |
| 1 0 1 0 | RESERVE |
| 1 0 1 1 | U |
| 1 1 0 0 | Space |
| 1 1 0 1 | – |
| 1 1 1 0 | ] |
| 1 1 1 1 | [ |

RADIO PAGING RECEIVER AND RADIO RECEIVER

FIELD OF THE INVENTION

This invention relates to a radio paging receiver and a radio receiver, and more particularly to, a radio paging receiver and a radio receiver with a display function.

BACKGROUND OF THE INVENTION

Some conventional radio paging receivers have a display function that a message signal to be transmitted following a receiver's own calling number is decoded and then displayed on its display, as well as a notifying function to notify a calling by a sound.

For example, Japanese patent application laid-open No. 5-199163 (1993) discloses a radio paging receiver with a display function to display a message composed of digits of 0 to 9 and some symbols. When a telephone number, e.g., 012-345-6789, is transmitted as a message, hyphens "-" can be inserted between positions predetermined by the receiver even when message signals corresponding to the hyphens "-" after "2" and "5".

Recently, a free word-displaying type radio paging receiver to display a message composed combining digits of 0 to 9, some symbols and Kana-letters (Japanese letters) is also developed. To such a radio paging receiver, a schedule message composed of time information and Kana information can be easily transmitted from an ordinary telephone terminal. For example, Japanese patent application laid-open No. 4-304039 (1992) discloses a free word-displaying type radio paging receiver to which a message composed of Kana letters and further Chinese characters can be transmitted. When a schedule message composed of date information enclosed by "[" and "]" and other information, e.g., "[Z24 /1800] Christmas Party in Yokohama" is transmitted, this radio paging receiver can identify the information as date information "December 24$^{th}$ 18:00" and can store the schedule message in its own storage, whereby it can be also used as an electronic notebook. Such a free word-displaying type radio paging receiver is in wide use since the advantage of radio paging receiver can be well utilized.

However, there are some problems in the conventional radio paging receiver. The first problem is that the operation is so complicated that one may make an operation error when inputting such a schedule message from a telephone terminal. Namely, for example, when transmitting a schedule message that a meeting is held at 15:00 of January 31$^{st}$, the format is to input digits for the month, day, hour and minute between codes "[" and "]" followed by Kana information; "[01-31-15-00]ｶｲｷﾞ". To divide the digits into the month, day, hour and minute, one has to input signals corresponding to "-(hyphens)" after "01", "31" and "15". When inputting it from a telephone terminal, for example, "*2" corresponding to "-" needs to be input.

The second problem is that the airtime is increased by that much. In the above example, the header (date and time display part) of the schedule message, "[01-31-15-00]ｶｲｷﾞ" is "[01-31-15-00]". When representing this by using only the codes "[" and "]" and digits, the header is transmitted as "[01311500]". Thus, as the schedule message, 14 codes, "[01311500]ｶｲｷﾞ" is transmitted. In the FLEX system mentioned above, information is transmitted using unit words, each word consisting of 32 bits of which 21 bits are information bits. The schedule message includes 56 bits because one code needs 4 bits. Thus, for the schedule message, the data transmission needs three words. Now, when three codes of "-(hyphen) " are added thereto, the data transmission needs four words because it includes 68 bits, adding 12 bits. In fact, the number of bits to be increased is by 21 bits, therefore the airtime must be increased.

The third problem is that, when transmitting the schedule message without adding the codes "-" in the above example, the receiver's owner cannot easily reads it because the received message is displayed without the codes "-", whereas the sender can easily conduct the inputting and the airtime can be reduced.

The fourth problem is that, when displaying the received schedule message on the display with having the three codes of "-", the number of codes to be displayed on the Kana display part is reduced by three codes, therefore Kana information is reduced.

SUMMARY OF THE INVENTION

Accordingly, it is an object of the invention to provide a radio paging receiver that allows its caller to easily input a schedule message and allows its user (callee) to easily view the received schedule message while reducing an airtime taken for the data transmission.

It is a further object of the invention to provide a radio receiver that allows its caller to easily input a schedule message and allows its user (callee) to easily view the received schedule message while reducing an airtime taken for the data transmission.

According to the invention, a radio paging receiver, comprises:

a radio unit that receives a carrier wave modulated by a specific paging signal and a message signal following the specific paging signal;

a demodulating unit that demodulates the modulated carrier wave into a signal;

a decoding unit that decodes the signal demodulated by the demodulating unit into the specific paging signal and the message signal according to a predetermined signal format;

a controller that compares the specific paging signal with a preset its own calling number and actuates a alert signal generating unit when the specific paging signal coincides with the calling number; and a display that displays a received message;

wherein the radio paging receiver has a function that judges whether to apply a code inserting function to a received schedule message signal or not, the code inserting function being operated such that a predetermined code is inserted into a predetermined position of the received schedule message signal when applying the code inserting function thereto is allowed.

According to another aspect of the invention, a radio receiver, comprises:

a radio unit that receives and demodulates a carrier wave modulated by a calling signal and a message signal following the calling signal;

a decoding unit that decodes a signal demodulated by the demodulating unit into the calling signal and the message signal according to a predetermined signal format;

a controller that compares the calling signal with a preset its own calling number and actuates a alert signal generating unit when the calling signal coincides with the calling number;

a display that displays a received message;

means for judging whether the message signal is a schedule message or not;

means for selecting a schedule display form when the message signal is judged as a schedule message signal; and means for inserting a predetermined code into a predetermined position of the schedule message signal according to the selected schedule display form.

BRIEF DESCRIPTION OF THE DRAWINGS

The invention will be explained in more detail in conjunction with the appended drawings, wherein:

FIG. 3 is a table showing an example of coding used in a conventional radio paging receiver.

DESCRIPTION OF THE PREFERRED EMBODIMENTS

Before explaining a radio paging receiver in the preferred embodiments, a message displaying in the aforementioned conventional radio paging receiver will be explained in FIGS. 1 to 3.

Figure 1:
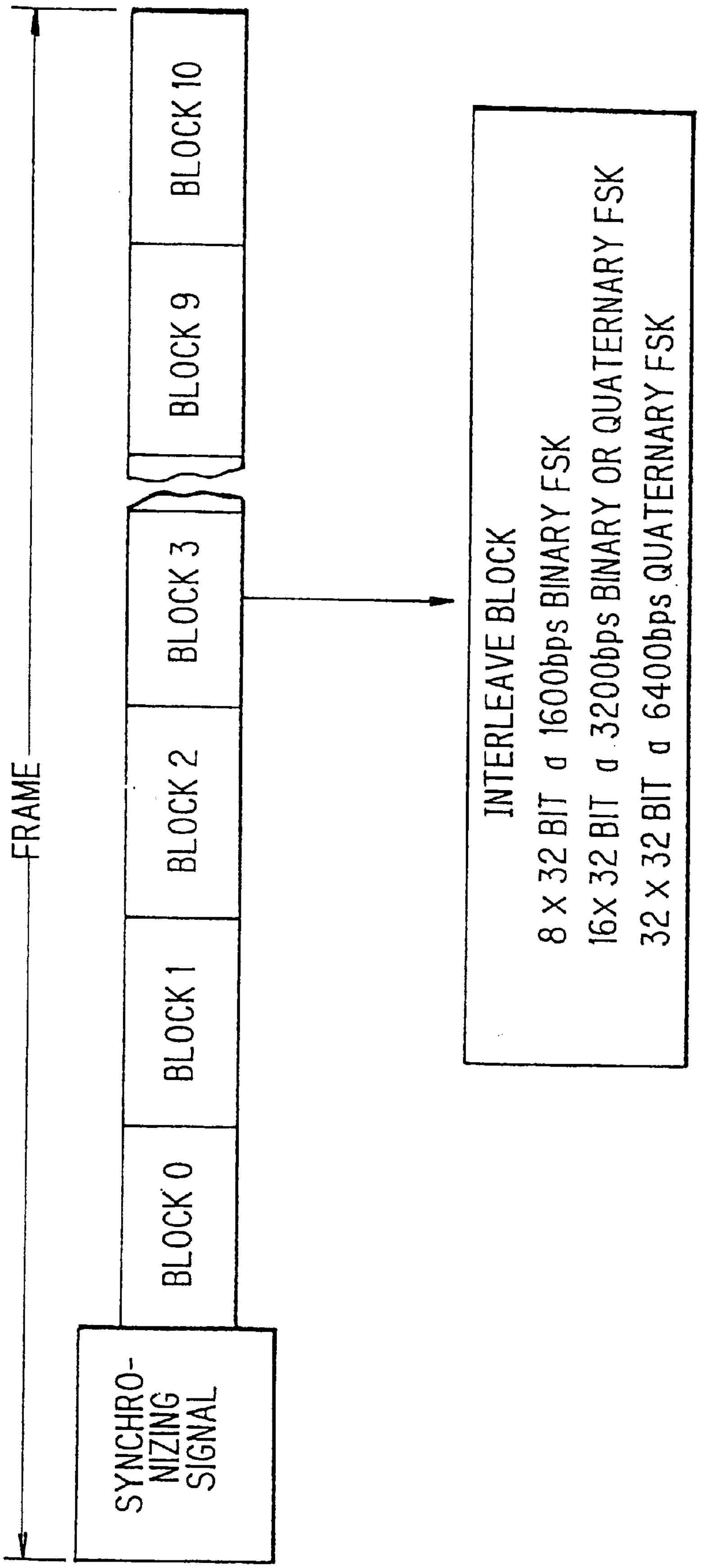
FIG. 1 PRIOR ART
FIG. 1 is an illustration showing an example of signal format used in a conventional radio paging receiver.

FIG. 1 shows a signal format of FLEX system that is a typical signal system used in free word-displaying type radio paging receivers. This format includes several blocks arranged using a synchronizing signal as a reference, where some block includes the contents of transfer speed and transfer bit composition as an interleave block. FIG. 3 shows 4-bit data to be used in the FLEX system. The FLEX system, which is one the second-generation radio paging systems developed by Motrola corp., USA, includes a synchronizing signal and an address/message identifying signal in one frame, and uses a binary FSK or a binary/quaternary FSK modulation system.

Figure 2:
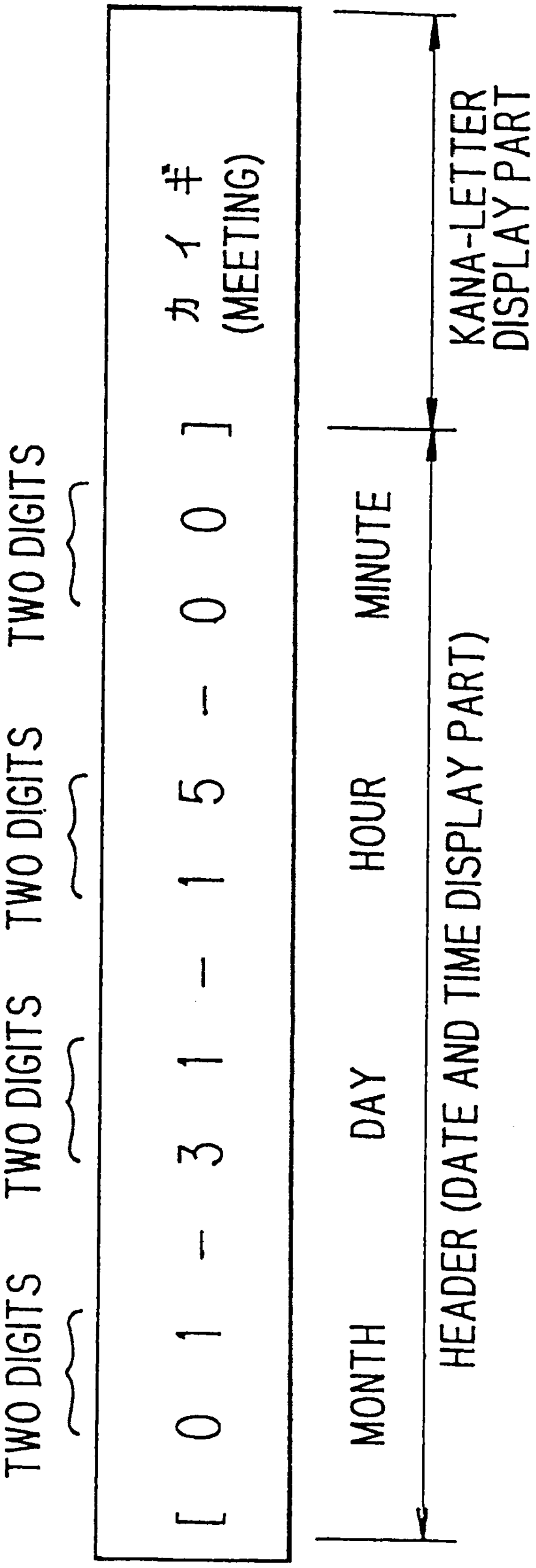
FIG. 2 PRIOR ART
FIG. 2 is an illustration showing an example of LCD display as a schedule message in a conventional radio paging receiver.

In a conventional free word-displaying type radio paging receiver, schedule message data, e.g., "[01-31-15-00]ｶｲｷﾞ(which means a meeting)" shown in FIG. 2, which are transmitted in the signal format in FIG. 1, are divided into a header (date and time display part) and Kana-letter display part to show the content of a schedule, decoded according to FIG. 3, displayed as shown in FIG. 2.

Figure 4:
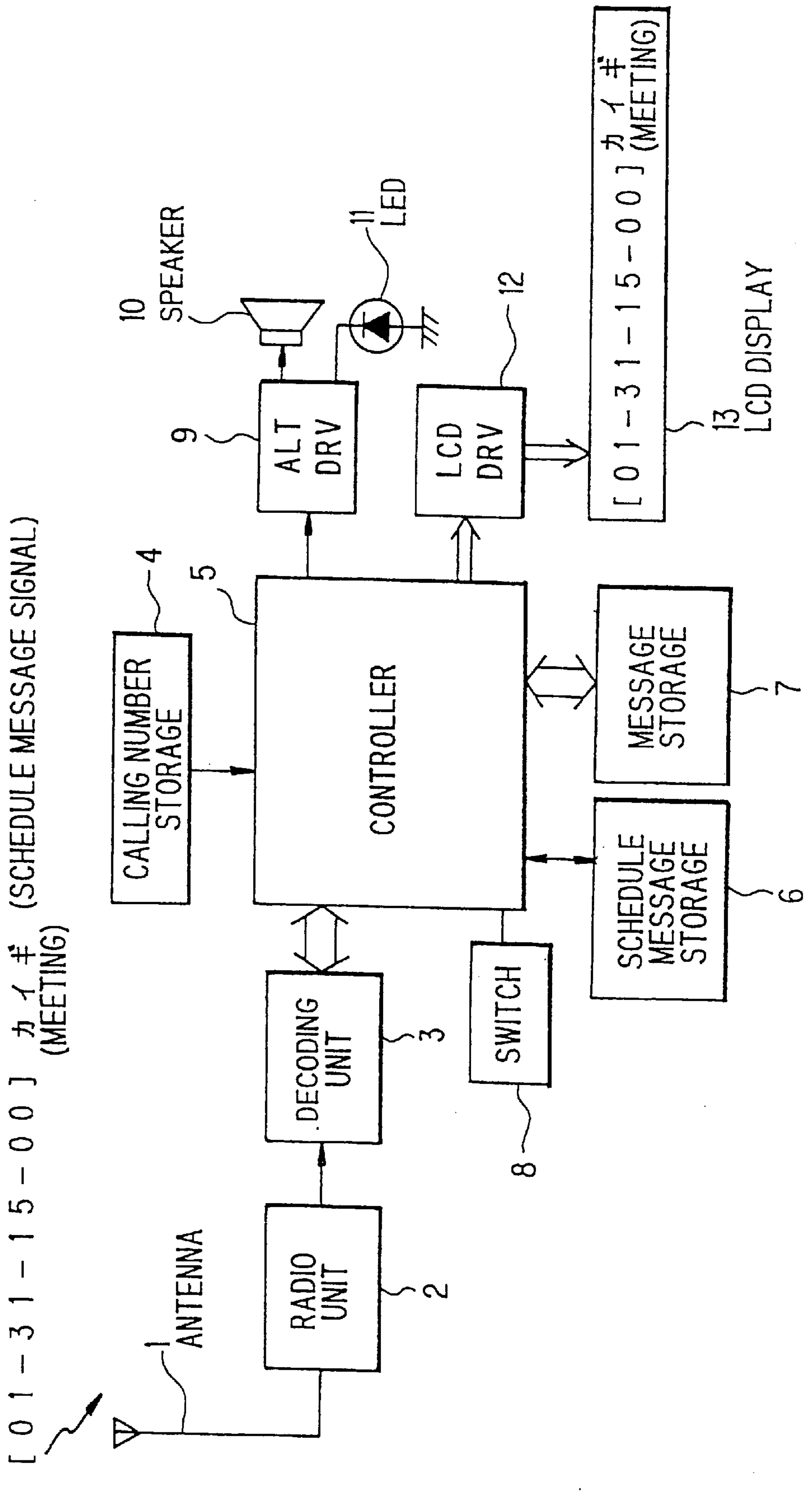
FIG. 4 is a block diagram showing a radio paging receiver in a first preferred embodiment according to the invention.

Next, a radio paging receiver in the first preferred embodiment according to the invention will be explained in FIG. 4. FIG. 4 is the block diagram showing the radio paging receiver in the first embodiment.

Referring to FIG. 4, a radio signal modulated by a paging signal and a message signal following that is received by an antenna 1, amplified and demodulated by a radio unit 2. A decoding unit 3 conducts the bit-synchronization and word-synchronization to the demodulated baseband signal, and then conducts the error correction etc. according to a predetermined coding system.

On the other hand, its own calling number previously stored in a calling number storage 4 is read out through a controller by the decoding unit 3, and is compared with the received paging number. When the paging number coincides with the calling number, a coincidence signal is sent with the message signal following the paging number to the controller 5.

Then, the controller 5 outputs an alarm to notify the message reception though an alert driver 9 to a speaker 10 and an LED 11.

Simultaneously, the controller 5 controls storing the received message signal in a message storage 7 as well as displaying the message as digit and letter information through a LCD driver by a LCD display 13. Further, when the message is a schedule message, it controls storing the schedule message in a schedule message storage 6 as well as displaying the schedule message as digit and letter information in various display forms instructed by the LCD display 13. In FIG. 4, a switch 8 is provided to operate the resetting of the alarm and display, the re-reading of display information etc.

In the first embodiment, when receiving a schedule message composed of a month, a day, an hour, a minute which are two digits each and Kana information, e.g., "[01311500]ｶｲｷﾞ(which means a meeting)", the LCD display 13 can optionally display "[01-31-15-00]ｶｲｷﾞ" including three codes "-" or "[01311500]ｶｲｷﾞ" not including three codes "-". The controller 5 can thus edit a message signal to provide a display easy to view as a schedule message or to increase Kana information by three codes. Meanwhile, when the message is a schedule message, it is stored in the schedule message storage 6 and then is edited. However, the schedule message storage 6 may be in an address region different from that of the message storage 7, i.e., it does not have to be a separate memory. Also, the storing into the storage 6 may be conducted after editing at the controller 5.

The above circuit composition of the radio paging receiver in the first embodiment may be also applied to a radio receiver, such as a POCSAG-system radio calling device, PHS (personal handyphone system), a portable telephone, second-generation radio calling system FLEX-TD (flex time diversity) etc. It is not limited to a use in radio paging receiver.

Also, the radio paging receiver in the first embodiment can also serve as an electronic notebook for its user's schedule management. Namely, by displaying, in time series, schedules stored in the schedule message storage 6, the user can know the schedules, which are received by the radio paging receiver, from the past time to the present time, and from the present time to the future time. Thereby, the user can act along the schedules. Furthermore, by providing a peripheral key, such as digital keys and a ten key, with the radio paging receiver, the user himself can also input a schedule. Thus, a total schedule management can be realized by combining this schedule with the schedule received by the radio paging receiver.

Figure 5:
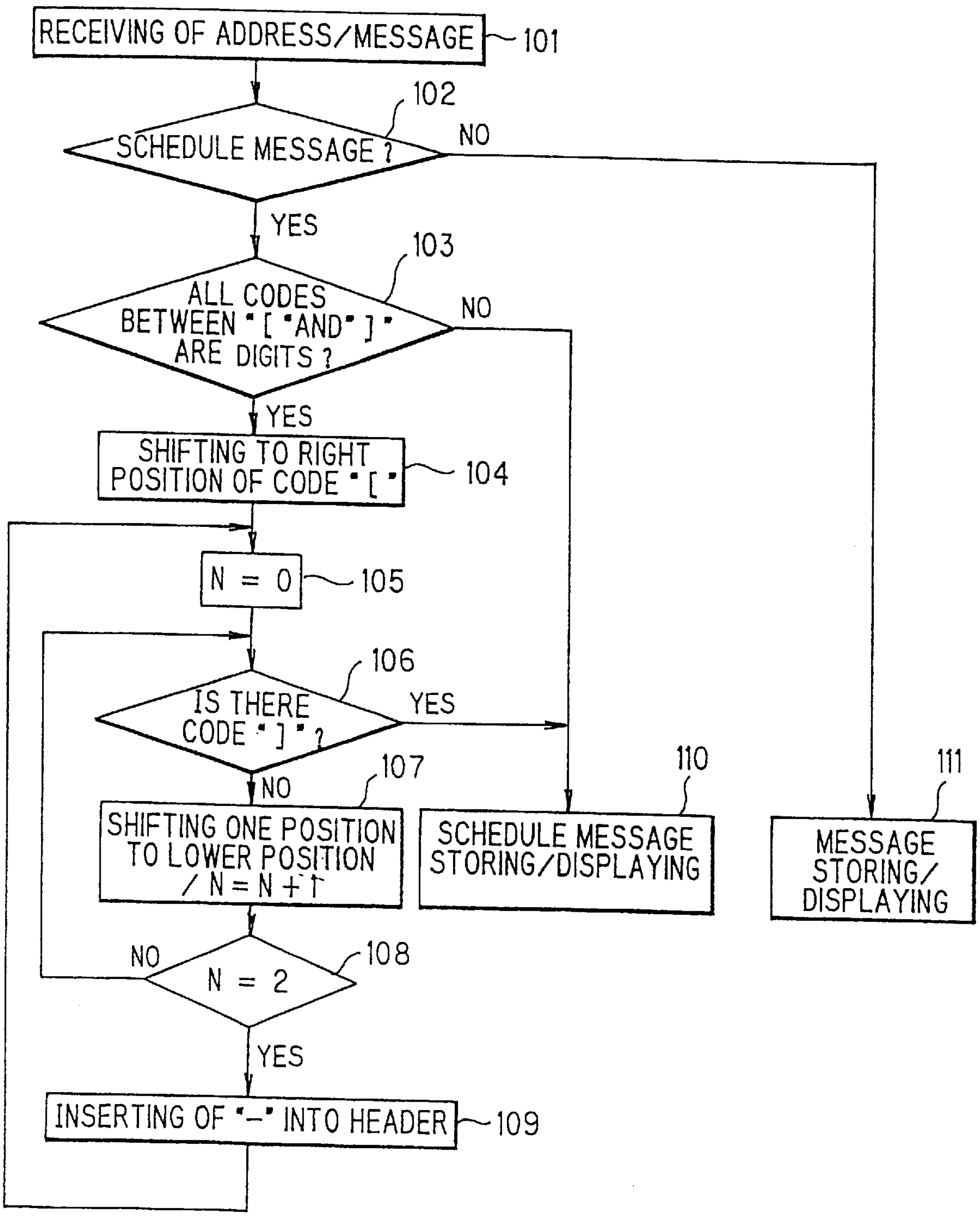
FIG. 5 is a flow chart showing the code processing procedure of the radio paging receiver in the first embodiment.

The operation of the radio paging receiver in the first embodiment as well as the specific method of editing the message signal in the controller 5 will be explained in FIG. 5. As shown in FIG. 5, when an address (paging number) and a message are received (step 101), it is judged whether to use the function of the embodiment or not, i.e., whether the message is a schedule message or not, by detecting whether the message is structured by a format including date information between codes "[" and "]" or not (step 102). If not the schedule message, then the controller 5 controls to store the message into the message storage 7 as well as to display it, as it is, through the LCD driver 12 by the LCD display 13 (step 111).

If it is judged as the schedule message, then it is checked whether a code etc. other than digits is included in the date information between codes "[" and "]" or not (step 103). If it is included, the message is stored in the schedule message storage 6 and is displayed on the LCD display 13 (step 110). If only digits are included, then the controller 5 shifts a pointer to the most significant digit, i.e., one digit to the right of code "[", of the header displayed on the LCD display 13 in FIG. 4 (step 104), and resets a position number counter N into zero (step 105). Then, it is judged whether a code "]" exists at the position that the pointer indicates at that time or not (step 106). If the code "]" does not exist there, then the pointer is shifted to the lower position as well as counting down by one count the position number counter N (step 107). If the counter N coincides with 2, the position number of a month, day, hour or minute in the header (step 108), then a code "-" is inserted between positions before and after shifting to the lower position in the header of the schedule message (step 109).

The same process (steps 105 to 109) is repeated. When a code "]" exists at the position that the pointer indicates at that time, the schedule message signal is stored in the schedule message storage 6 and is displayed as, e.g., "[01-31-15-00]ｶｲｷﾞ" on the LCD display 13 (step 110).

If the message is not a schedule message applicable to the edit function, it is stored in the message storage 7 and is displayed on the LCD display 13 (step 111).

In the first embodiment, even when inputting the schedule marks "[" and "]" and continuously inputting digits therebetween from a telephone terminal on the caller side, the radio paging receiver can display the schedule message in a predetermined display manner. As a result, the caller can easily input the schedule message.

Figure 6:
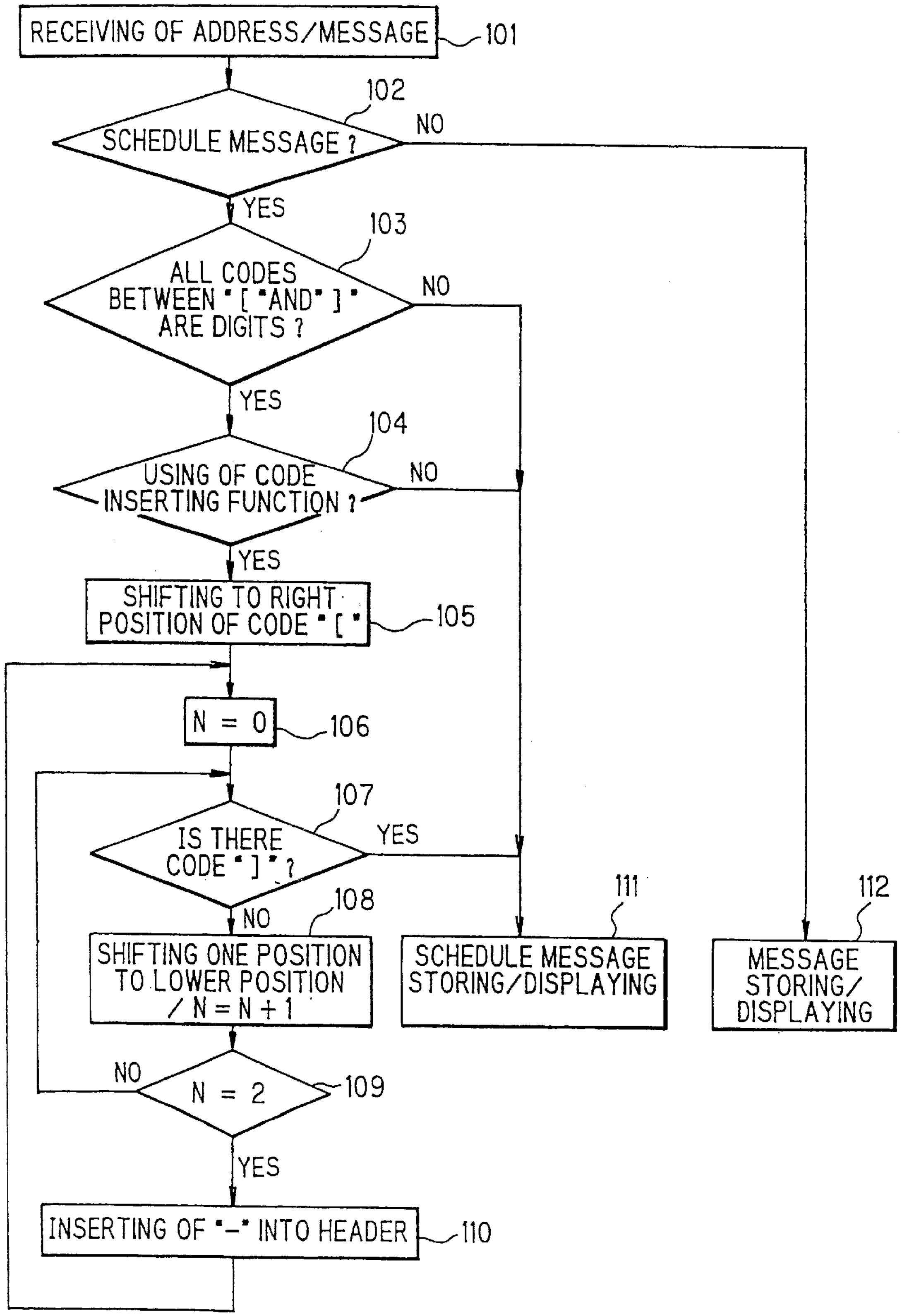
FIG. 6 is a flow chart showing the code processing procedure of a radio paging receiver in a second preferred embodiment according to the invention.

A radio paging receiver in the second preferred embodiment according to the invention will be explained in FIG. 6. The radio paging receiver in the second embodiment has the same composition as that in the first embodiment. In the second embodiment, the content of OS (operating system) or an application program stored in a storage (not shown) to operate the controller 5 is different from that in the first embodiment.

In the second embodiment, a further function that one can select whether to use the code inserting function is added to the first embodiment. Namely, when the received message is a schedule message, the user can select whether to use the code inserting function or not, by the switch 8 in FIG. 4 (step 104 in FIG. 6). When he selects to use it, the following operations are conducted along flow chart in FIG. 5. When he does not select to use it, the schedule message signal is, as it is, stored in the schedule message storage 6 and is displayed on the LCD display 13 as, e.g., "[01311500]ｶｲｷﾞ" (step 111 in FIG. 5). The other operations are similar to those in the first embodiment. If the message is not a schedule message, it is stored in the message storage 7 and is, as it is, displayed on the LCD display 13 (step 111 in FIG. 5).

Figure 7:
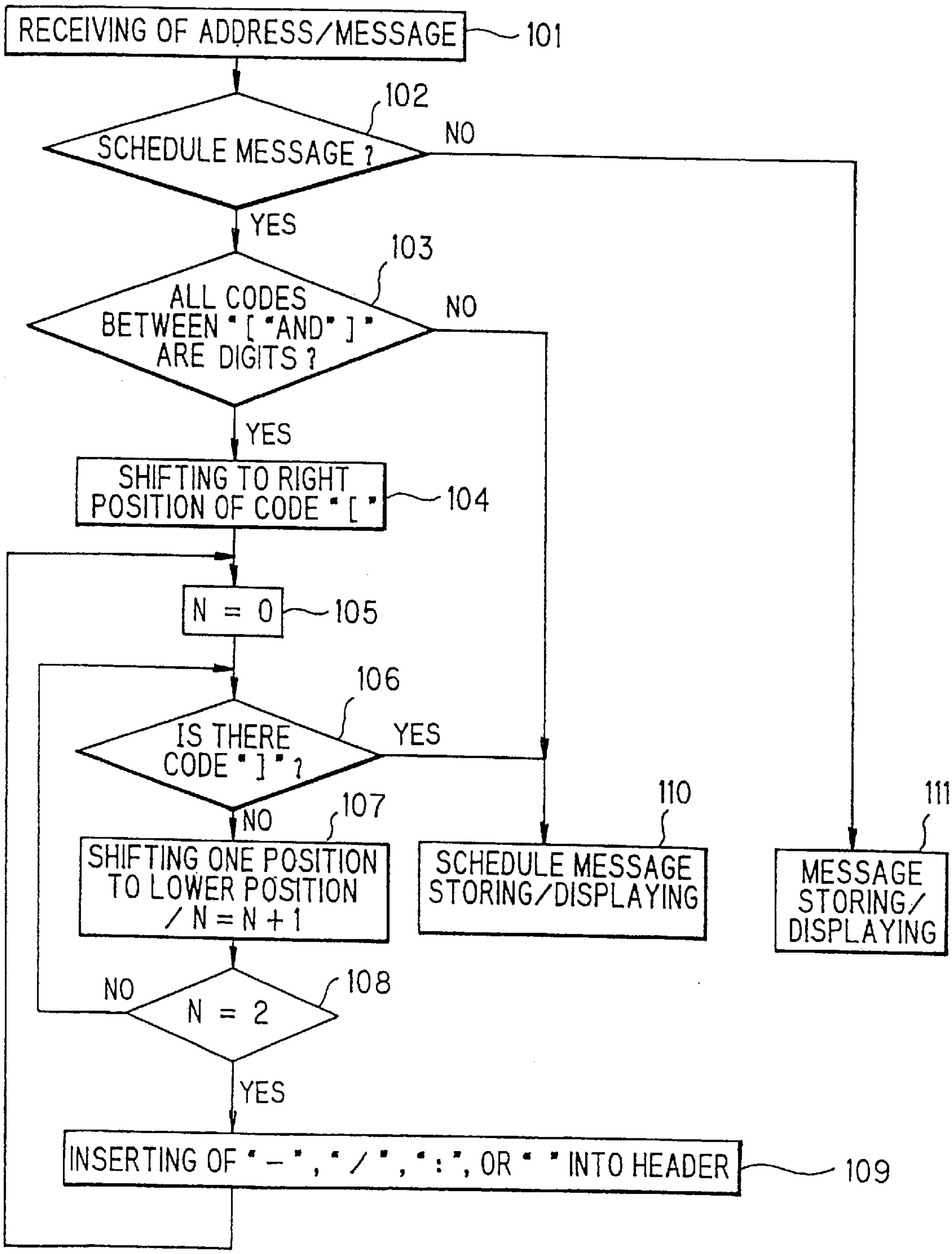
FIG. 7 is a flow chart showing the code processing procedure of a radio paging receiver in a third preferred embodiment according to the invention.

A radio paging receiver in the third preferred embodiment according to the invention will be explained in FIG. 7. The radio paging receiver in the third embodiment has the same composition as that in the first embodiment. In the third embodiment, the content of OS (operating system) or an application program stored in a storage (not shown) to operate the controller 5 is different from those in the first and second embodiments.

In the third embodiment, as the code to be inserted into header to facilitate the viewing of date, "/(slash)", ":(colon)", "(space)" etc. adding to "-(hyphen)" can be used. Namely, further to the flow chart in FIG. 5, a function that a code selected from "-", "/", ":", " " etc. is inserted into the header is added (step 109 in FIG. 7). For example, in selecting any one of the codes, the display is as follows:

[01-31-15-00]ｶｲｷﾞ,

[01/31/15/00]ｶｲｷﾞ,

[01:31:15:00]ｶｲｷﾞ or

[01 31 15 00]ｶｲｷﾞ.

This display is performed by selecting any one of the codes "-", "/", ":" or " " in step 109. The selection can be conducted according to a pre-stored program.

Figure 8:
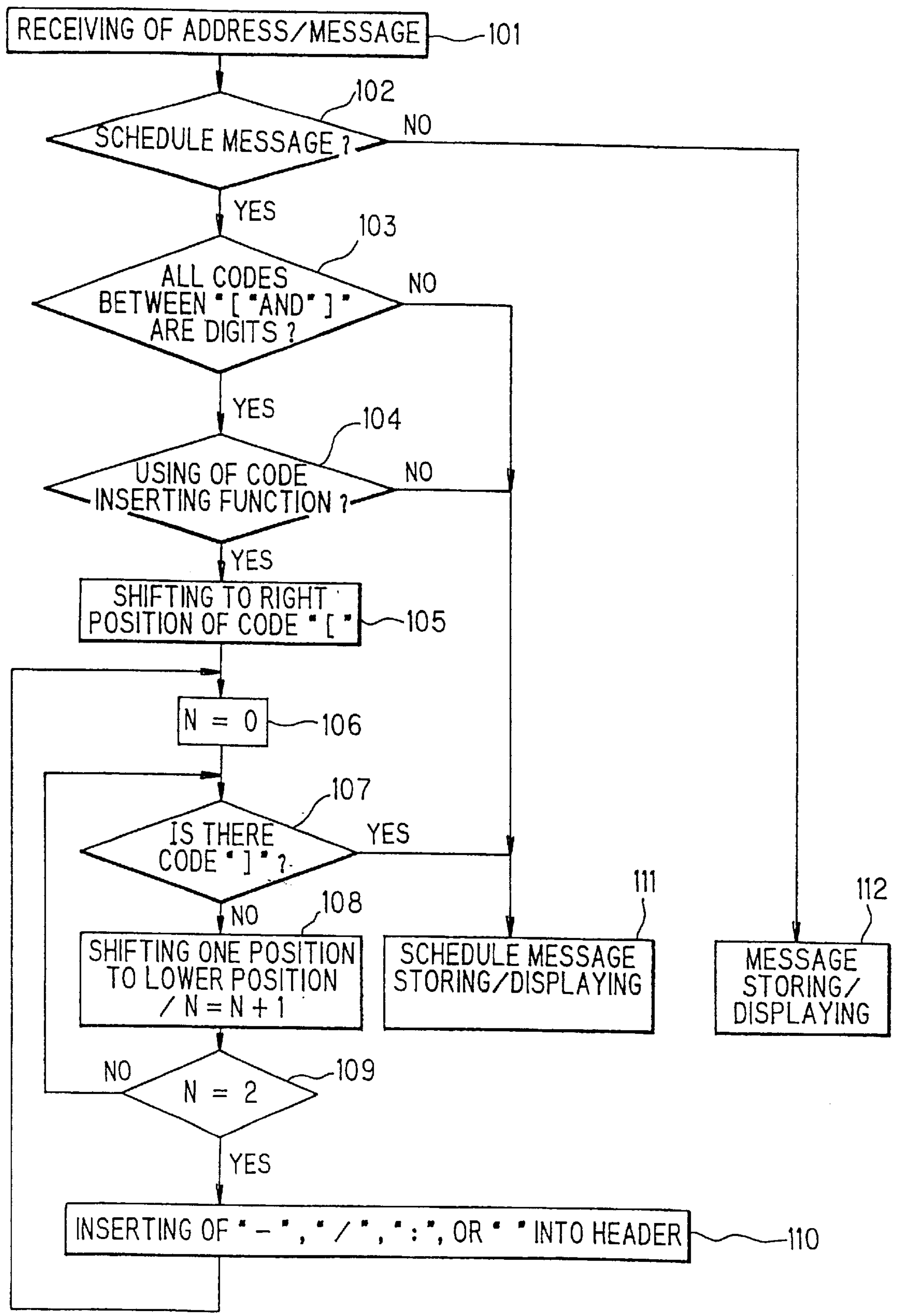
FIG. 8 is a flow chart showing the code processing procedure of a radio paging receiver in a fourth preferred embodiment according to the invention.

A radio paging receiver in the fourth preferred embodiment according to the invention will be explained in FIG. 8. The radio paging receiver in the fourth embodiment has the same composition as that in the first embodiment. In the fourth embodiment, the content of OS (operating system) or an application program stored in a storage (not shown) to operate the controller 5 is different from those in the first to third embodiments.

In the fourth embodiment, a further function that one can select whether to use the code inserting function (step 104 in FIG. 8) is added to the third embodiment. When he selects to use it, the following operations are conducted along flow chart in FIG. 7. When he does not select to use it, the schedule message signal is, as it is, stored in the schedule message storage 6 and is displayed on the LCD display 13 (step 111 in FIG. 8). The content to be displayed in the fourth embodiment is the same as that in the third embodiment. One can select any one of the codes to be displayed, by the switch 8.

Figure 9:
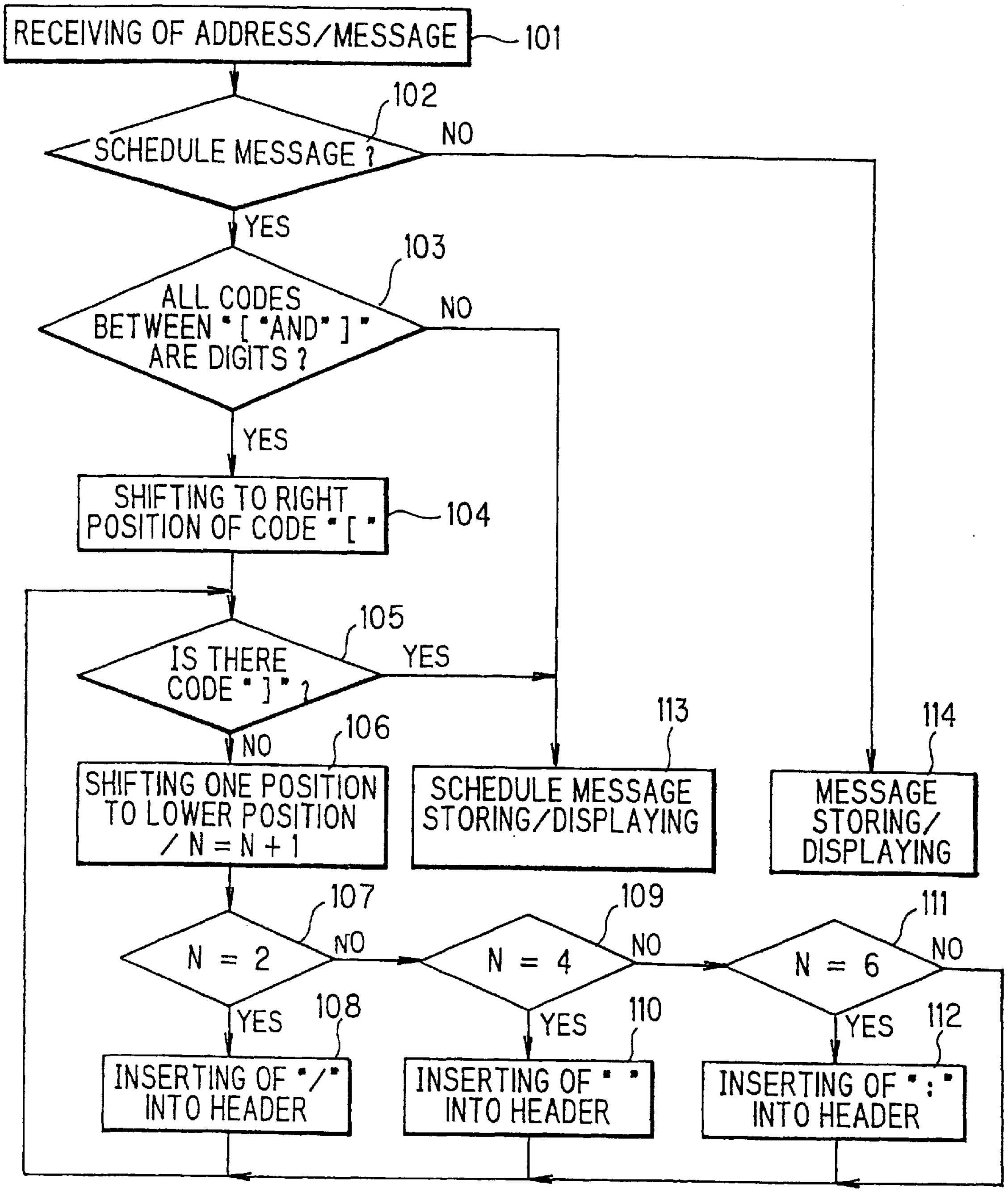
FIG. 9 is a flow chart showing the code processing procedure of a radio paging receiver in a fifth preferred embodiment according to the invention.

A radio paging receiver in the fifth preferred embodiment according to the invention will be explained in FIG. 9. The radio paging receiver in the fifth embodiment has the same composition as that in the first embodiment. In the fifth embodiment, the content of OS (operating system) or an application program stored in a storage (not shown) to operate the controller 5 is different from those in the first to fourth embodiments.

In the fifth embodiment, a further function that a code selected from "-", "/", ":", " " etc. is inserted into an arbitrary position of the header is added to the third embodiment. Namely, when the counter N coincides with 2 (step 107 in FIG. 9), the code "/" is inserted (step 108 in FIG. 9). Also, when the counter N coincides with 4 (step 109 in FIG. 9), the code " " is inserted (step 110 in FIG. 9). Further, when the counter N coincides with 6 (step 111 in FIG. 9), the code ":" is inserted (step 112 in FIG. 9). Accordingly, in this embodiment, "[01/31 15:00 ]ｶｲｷﾞ" is displayed.

When the counter N does not coincide with any of 2, 4 and 6, the operation is repeated shifting the pointer as well as counting down the counter number. When the code "]" exists at a position indicated by the pointer (step 105 in FIG. 9), the schedule message signal is stored in the schedule message storage 6 and is displayed on the LCD display 13 (step 113 in FIG. 9).

Meanwhile, the function of the fifth may be selected by the switch 8.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A radio paging receiver, comprising:

a radio unit that receives a carrier wave modulated by a specific paging signal and a message signal following said specific paging signal;

a demodulating unit that demodulates said modulated carrier wave into a signal;

a decoding unit that decodes said signal demodulated by said demodulating unit into said specific paging signal and said message signal according to a predetermined signal format;

a controller that compares said specific paging signal with its own preset calling number and actuates an alert signal generating unit when said specific paging signal coincides with said calling number; and a display that displays a received message;

wherein said radio paging receiver has a function that identifies an occurrence of a received schedule message signal comprising only numeric digits within predetermined, end-point delimiters and subsequently judges whether or not to apply a code inserting function to the received schedule message signal, said code inserting function being operated such that a predetermined code is inserted into a predetermined position of said received schedule message signal when applying said code inserting function thereto is allowed.

2. A radio paging receiver, according to claim 1, wherein:

said radio paging receiver has a function that a user can select whether to use said code inserting function or not when applying said code inserting function thereto is allowed.

3. The radio receiver of claim 1, wherein the received schedule message signal with the inserted predetermined code is displayed on said display together with a non-numeric character message associated with the received schedule message.

4. A radio paging receiver, according to claim 1, wherein:

said code inserting function is operated such that an arbitrary code is inserted into a predetermined position of said received schedule message signal.

5. A radio paging receiver, according to claim 4, wherein:

said radio paging receiver has a function that a user can select whether to use said code inserting function for inserting said arbitrary code or not when applying said code inserting function thereto is allowed.

6. A radio paging receiver, according to claim 4, wherein:

said code inserting function is operated such that an arbitrary code is inserted into an arbitrary position of said received schedule message signal.

7. A radio receiver, comprising:

a radio unit that receives and demodulates a carrier wave modulated by a calling signal and a message signal following said calling signal;

a decoding unit that decodes a signal demodulated by said demodulating unit into said calling signal and said message signal according to a predetermined signal format;

a controller that compares said calling signal with its own preset calling number and actuates an alert signal generating unit when said calling signal coincides with said calling number;

a display that displays a received message;

means for judging whether or not said message signal is a schedule message;

means for selecting a schedule display form when said message signal is judged as a schedule message signal; and means for inserting a predetermined code into a predetermined position of said schedule message signal according to the selected schedule display form, wherein said message is judged to be a schedule message signal by the occurrence of exclusively number digits within a set of predetermined message end-point delimiters.

8. The radio receiver of claim 7, wherein said display displays said schedule message signal simultaneously with the inserted predetermined code in conjunction with a non-numeric character message.

* * * * *